United States Patent [19]

Birgmeir

[11] Patent Number: 4,757,351
[45] Date of Patent: Jul. 12, 1988

[54] METHOD OF AND ARRANGEMENT FOR LINE-BY-LINE AND POINT-BY-POINT REPRODUCTION OF A COLORED ORIGINAL

[75] Inventor: Klaus Birgmeir, Putzbrunn, Fed. Rep. of Germany

[73] Assignee: AGFA-Gevaert Aktiengesellschaft, Leverkusen, Fed. Rep. of Germany

[21] Appl. No.: 85,975

[22] Filed: Aug. 14, 1987

[30] Foreign Application Priority Data

Sep. 2, 1986 [DE] Fed. Rep. of Germany ....... 3629793

[51] Int. Cl.$^4$ .............................................. G03B 27/80
[52] U.S. Cl. ......................................... 355/38; 355/77
[58] Field of Search ....................... 355/38, 68, 77, 88, 355/83

[56] References Cited

U.S. PATENT DOCUMENTS

| | | | |
|---|---|---|---|
| 4,101,217 | 7/1978 | Fergg et al. | 355/38 |
| 4,279,502 | 7/1981 | Thurm et al. | 355/38 |
| 4,406,538 | 9/1983 | Bühler | 355/38 X |
| 4,492,458 | 1/1985 | Bickl et al. | 355/38 |
| 4,561,768 | 12/1985 | Fürsich et al. | 355/38 |

FOREIGN PATENT DOCUMENTS 3412723 10/1985 Fed. Rep. of Germany .

OTHER PUBLICATIONS

"An Experimental Cathode-Ray Tube Printer", Durkin, Journal of Imaging Technology, vol. 12, No. 3, Jun. 1986, pp. 135–139.

Primary Examiner—Richard A. Wintercorn
Attorney, Agent, or Firm—Peter K. Kontler

[57] ABSTRACT

A transparent colored original is scanned region-by-region and the density of each region in each of the primary colors red, green and blue determined. Each region represents an area constituted by a large number of points. The densities for each region are processed to generate parameters characteristic of the coloring of the respective region. These parameters are compared with respective threshold values. An overall density for the original in each of the primary colors is now calculated. In performing these calculations, those regions for which the characteristic color parameters exceed the respective threshold values are assigned less weight than the remaining regions. This is due to the fact that the former regions are assumed to contain color dominants. The orginal is next scanned line-by-line and point-by-point in each of the primary colors to generate imaging signals for use in printing the original on copy material. The magnitudes of the imaging signals are regulated in such a manner that the magnitudes of the signals for the different primary colors have a relationship similar to the overall densities of the original in the primary colors. The imaging signals are electronically processed to enhance the image of the original and the processed imaging signals are then supplied to a printer which reproduces the original line-by-line and point-by-point.

28 Claims, 2 Drawing Sheets

METHOD OF AND ARRANGEMENT FOR LINE-BY-LINE AND POINT-BY-POINT REPRODUCTION OF A COLORED ORIGINAL

BACKGROUND OF THE INVENTION

The invention relates generally to the copying of a colored original.

More particularly, the invention relates to a method of and an arrangement for copying a colored original line-by-line and point-by-point.

In order to reproduce a colored original, it is known to electronically scan the original line-by-line in each of the three primary colors blue, red and green. Electrical imaging signals are generated by the scanning operation, and these signals are electronically processed to enhance the final image of the original.

Such electronic image processing is being increasingly used in the production of colored positive images from colored negatives or diapositives. During image processing, the imaging signals are corrected or modified according to specific criteria. The modified imaging signals are sent to a color exposure device. The exposure device converts the electrical imaging signals back into an optical image which is exposed onto photographic copy material, e.g., color negative paper. A procedure of this type, as well as an apparatus for performing the procedure, is disclosed, for example, in "An Experimental Cathode Ray Tube Printer", Journal of Imaging Technology, Vol. 12, No. 3, pp. 135–139.

By selective adjustment of amplifiers in the three color channels, an apparatus of this type makes it possible to change the relative intensities of the different colors for purposes of correction, e.g., for the correction of color casts. The apparatus may be equipped with a color monitor and an appropriate simulator for the brightness and color gradations to be expected in the copy. In this manner, the color and density corrections made by adjustment of the amplifiers in the color channels may be immediately visualized on the monitor. However, due to the very subtle differences in shades which are required for high-quality copies, the adjustments to compensate for color casts are time-consuming and require trained personnel.

In contrast to the above, very reliable methods for automatic color correction have been developed for color copying with integral exposures. For instance, the West German Auslegeschrift No. 25 35 034 discloses a method in which photographic color negatives are examined region-by-region for the presence of color dominants. In calculating overall densities for a negative in the three primary colors, those regions containing color dominants are given less weight than the remaining regions. As used throughout the specification and claims, the phrase "less weight" includes zero weight. The relationships between the overall densities in the different primary colors are used to adjust the ratios of the primary colors in the copying light so that an area of the original which is essentially neutral gray, that is, which is free of dominants, is neutral gray in the copy.

The criteria for detecting color dominants and for adjusting the ratios of the primary colors in the copy light as a function of the relationships derived from dominant-free regions cannot be readily employed for the processing of imaging signals in color reproduction methods involving point-by-point exposures. The reason is that the number of points to be exposed is generally large, e.g., of the order of 2 million, so that these criteria consume excessive amounts of time and require excessive calculations.

The West German Offenlegungsschrift No. 34 12 723 discloses a method for setting a scanner in dependence upon an original to be reproduced. Here, the scanner is adjusted to a computer serving to calculate the exposures in the different primary colors. For optimum adjustment, the intensity at the scanner during scanning of the original is set in such a manner that the output signals of the photomultiplier for the brightest and darkest points of the original respectively correspond to the maximum and minimum input signals to the computer. This method thus functions solely to adjust the scanner to the exposure computer.

OBJECTS AND SUMMARY OF THE INVENTION

It is an object of the invention to provide a method for the point-by-point reproduction of a colored original which enables color corrections to be made relatively simply.

Another object of the invention to provide a method for the point-by-point reproduction of a colored original which allows color corrections to be made relatively quickly.

A further object of the invention to provide a method for the point-by-point reproduction of a colored original which permits color corrections to be made without undue calculation.

An additional object of the invention to provide an arrangement for the point-by-point reproduction of a colored original which is capable of making color corrections in a relatively simple manner.

It is also an object of the invention to provide an arrangement for the point-by-point reproduction of a colored original which can make color corrections relatively expeditiously.

Yet another object of the invention is to provide an arrangement for the point-by-point reproduction of a colored original which is capable of making color corrections without undue calculation.

Still a further object of the invention is to improve upon a method of the type outlined above so that it becomes possible to compensate for color casts automatically by specifying predetermined relationships between the different color components of the copy light.

The preceding objects, as well as others which will become apparent as the description proceeds, are achieved by the invention.

One aspect of the invention resides in a method of copying a colored transparent original. The method involves measuring the densities of each of a multiplicity of regions of the original in each of the primary colors, namely, blue, red and green. As used throughout the specification and claims, a "region" of an original is an area constituted by a large number of points and thus many times larger than a single point. The measuring operation may be accomplished, for example, using a light source and a photodetector. An overall density is calculated for the original in each of the primary colors taking color dominants into account. The original is scanned point-by-point in each of the three primary colors. Imaging signals for each of the primary colors are generated by the scanning operation, and the magnitudes of the signals for any given primary color are increased relative to the magnitudes of the signals for another primary color having a lower overall density than the given color. An image of the original is formed on copy material point-by-point based on the imaging signals. A cathode ray tuber may be used, for instance, to form the image of the original.

The operations of scanning the original and forming an image of the latter are preferably performed line-by-line as well as point-by-point.

The method may further include the operation of processing the imaging signals to enhance the image. The processing operation, which takes place between the scanning and image forming operations, is advantageous carried out electronically.

The method may also involve using the measured densities of the original to derive at least one parameter for each region of the original which is characteristic of the coloring of the respective region. Each of the parameters obtained in this manner is compared with a threshold value. The operation of calculating overall densities for the original in the three primary colors is then performed by assigning less weight to regions for which the parameter exceeds the threshold value than to regions for which the parameter is below the threshold value. In this regard, when the parameter for a region exceeds the threshold value, there is a high probability that the region has a color dominant.

According to the invention, an original is examined for the presence of color dominants region-by-region before undergoing the actual scanning operation to thereby obtain an overall density for the original in each of the three primary colors. The relationships between these overall densities are then used to establish such relationships between the primary color components of the copy light that a neutral gray region of the original is neutral gray and free of color casts in the copy. Inspection of the original for color dominants is performed using a density measuring device distinct from the scanning device which scans the original point-by-point. This allows the regions which are examined for the presence of color dominants to be selected independently of the points used for scanning and to be substantially larger than such points. For instance, these regions may be of a size found to be suitable in other color correction procedures, namely, a size yielding approximately 100 regions per original. Moreover, the magnitudes of the imaging signals obtained from the scanning device are directly modified in accordance with the desired relationships between the different color components of the copy light before the signals are processed for image enhancement. This makes it unnecessary to employ complicated procedures such as an increase in color saturation, etc. for the effects of color casts.

The magnitudes of the imaging signals are advantageously regulated by controlling the intensity of illumination of the scanning device during the scanning operation. This may be accomplished by very simple means such as a diaphragm in the optical path having an adjustable aperture or a disc-like element having transparent sections of different gray density which are selectively movable into the optical path.

Another aspect of the invention resides in an arrangement for copying a colored transparent original. The arrangement comprises means for measuring the densities of each of a multiplicity of regions of the original in each of the three primary colors, and the measuring means is operative to measure regions of the original constituted by a large number of points. The arrangement further comprises means for calculating an overall density for the original in each of the three primary colors based on the measured densities and taking color dominants into account. The calculating means may, for example, include a computer and a memory. The arrangement also comprises means for scanning the original point-by-point in each of the three primary colors, and the scanning means is operative to generate imaging signals for each of the primary colors. The arrangement additionally comprises means for regulating the magnitudes of the imaging signals as a function of the relationships between the overall densities of the original in the three primary colors.

The scanning means is preferably designed to scan the original line-by-line as well as point-by-point.

The calculating means may function to process the measured densities of the original so as to derive at least one parameter for each region which is characteristic of the coloring of the respective region, and to compare each parameter with a threshold value. The calculating means then calculates the overall densities for the original by assigning less weight to regions for which the parameter exceeds the threshold value than to regions for which the parameter is below the threshold value.

The arrangement of the invention is particularly well-suited for carrying out the method of the invention.

The novel features which are considered as characteristic of the invention are set forth in particular in the appended claims. The improved copying arrangement itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
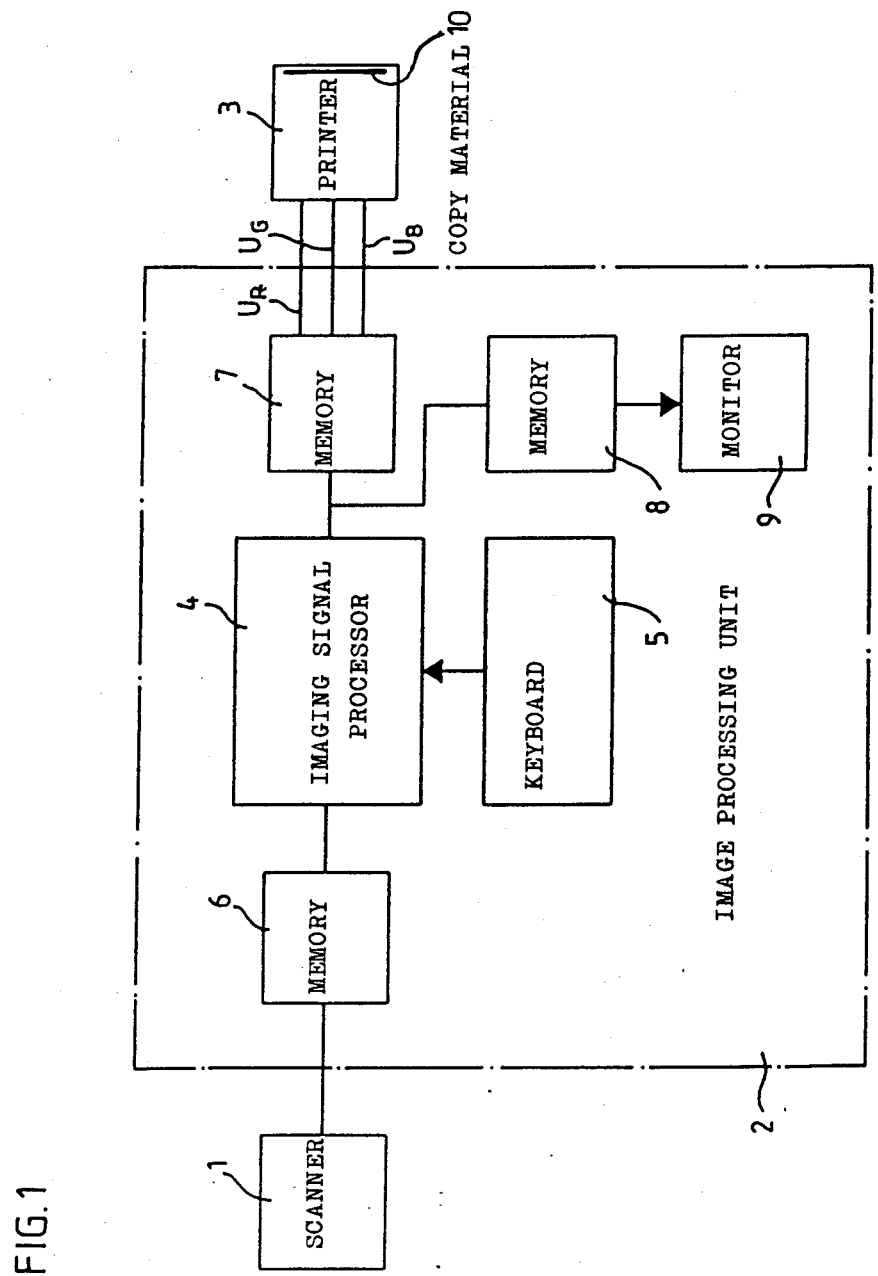
FIG. 1 is a block diagram of an arrangement according to the invention for line-by-line and point-by-point reproduction of a colored original.

FIG. 1 shows an arrangement for copying a colored transparent original such as a colored negative or diapositive. The arrangement includes a scanner 1 which is designed to scan the original line-by-line and point-by-point. To this end, the scanner 1 comprises an elongated linear, i.e., straight, sensor in the form of a charge-coupled device. The sensor is arranged to traverse the original in the vertical direction at constant speed. Scanning of the original is performed successively in the three primary colors red, green and blue by successively moving different color filters into the optical path.

The original is scanned along 1024 horizontal lines disposed one above the other and at 2048 points per line. A signal is generated for each point and each primary color, and the scanning operation thus results in an electrooptical image consisting of 2048×1024 image elements, i.e., pixels, in each of the three primary colors red, green and blue. A conventional non-illustrated correction circuit is provided to eliminate errors specific to the charge-coupled device serving as a sensor, e.g., errors such as dark currents and different sensitivities of the elements of the charge-coupled device.

The corrected imaging signals are digitized via a conventional non-illustrated analog-digital converter and sent to an image processing unit 2. The image processing unit 2 has an input in the form of a memory 6 the capacity of which is just sufficient to store the series of imaging signals obtained during scanning of the original. The memory output is connected to an imaging signal processor 4 which likewise constitutes part of the image processing unit 2 and is designed to electronically improve or enhance the image of the original with respect to edge definition, detail accentuation, color saturation, etc. in a conventional manner. The imaging signal processor 4 is controlled by a keyboard 5 which allows operating personnel to carry out specific correction procedures. A second memory 7 for imaging signals is connected to the output of the imaging signal processor 4 as is a third memory 8 which is arranged in parallel with the memory 7. The output of the memory 8 is connected to a color monitor 9 which makes it possible to observe the image of the original stored in the memories 7,8 as it will be reproduced during a subsequent copying operation.

The keyboard 5, memories 7,8 and monitor 9 all also constitute part of the image processing unit 2.

The output of the memory 7 is connected to a printer 3 which receives processed imaging signals $U_R$, $U_G$ and $U_B$ for the respective red, green and blue color components of the image from the memory 7. The printer 3 functions to successively expose these three color components of the image on photographic color copy material 10 by successively moving appropriate copying filters into the optical path. The printer 3 forms the image of the original on the copy material 10 line-by-line and point-by-point and this may be accomplished, for example, using a cathode ray tube. Details of a printer such as the printer 3 are disclosed, for instance, in the commonly-owned, copending application Ser. No. 085,943, filed Aug. 14, 1987.

The provision of the two memories 6 and 7 makes it possible for the printer 3 to read out and print an image stored in the memory 7 at the same time that a new image is being read into the memory 6 and processed by the imaging signal processor 4. The three basic operations of scanning with the scanner 1, processing an image in the imaging signal processor 4 and printing an image with the printer 3 can thus be disassociated from one another in time.

Figure 2:
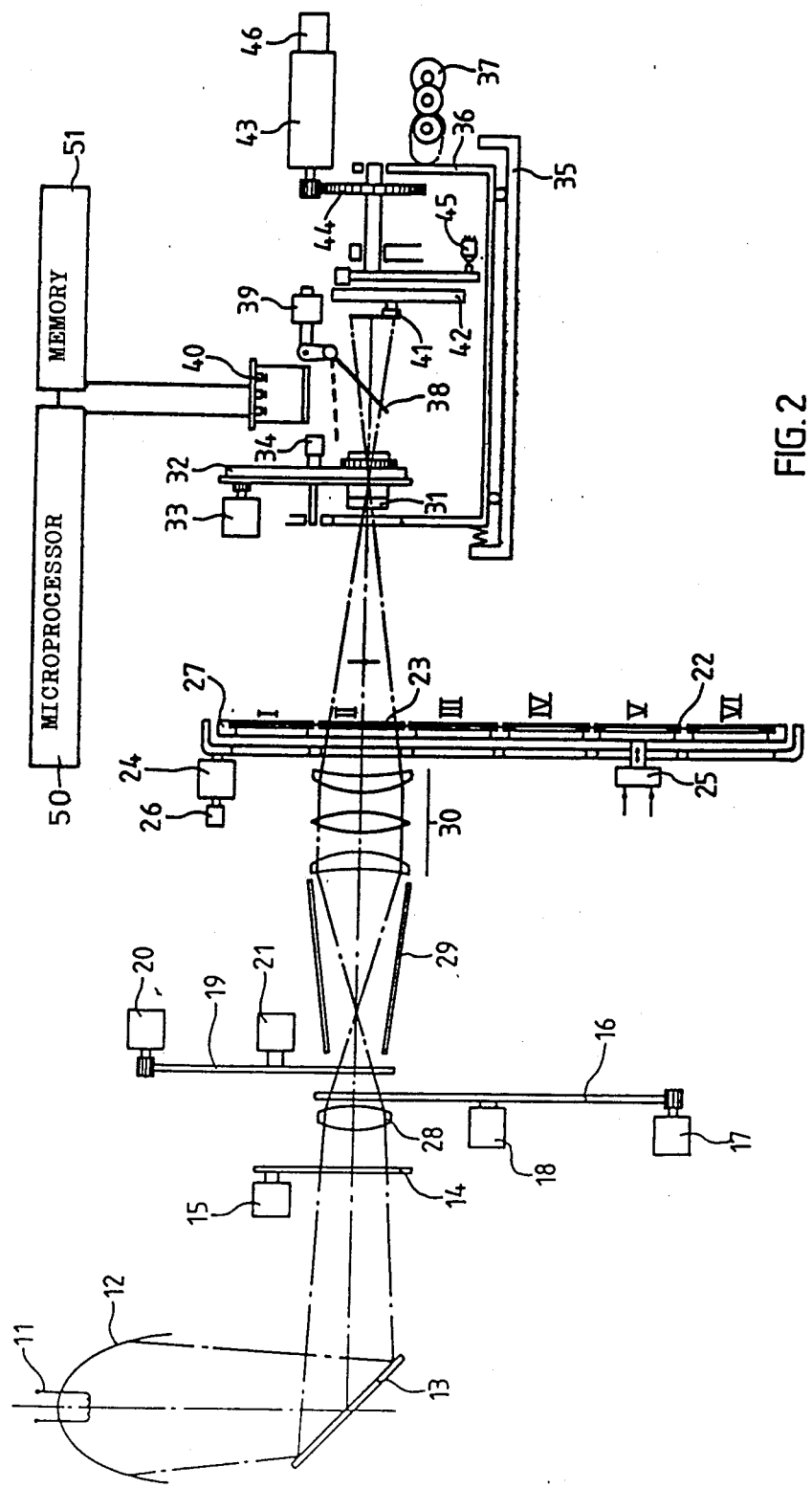
FIG. 2 is a schematic view, as seen along the optical path, of a scanner forming part of the arrangement of FIG. 1.

FIG. 2 is a schematic longitudinal representation of the scanner 1. It may be seen that the scanner 1 includes a source of illumination 11, e.g., a halogen lamp, and a reflector 12. The reflector 12 directs the light from the lamp 11 to a cold light reflector 13 having an inclination of 45°, and the reflector 13, in turn, directs the light to a condenser 28. A shutter 14 is disposed between the reflector 13 and the condenser 28 and is movable between an open position and a closed position by a drive 15, e.g., a rotary magnet. The light passing through the condenser 28 enters a mixing shaft 29 having reflective inner surfaces. The mixing shaft 29 serves to eliminate any non-uniformities in the intensity distribution of the light by reflection at its inner surfaces. A group 30 of additional condensers effects directed and uniform irradiation of colored transparent originals 23 mounted in a holder 27.

A device 16 for reducing the intensity of the illumination from the lamp 11 is located between the condenser 28 and the mixing shaft 29. The device 16 is here in the form of a disc having transparent gray sections of different density. Thus, the periphery of the disc 16 is provided with a series of gray filters each of which has a size corresponding to the cross-sectional area of the light beam arriving from the lamp 11. The densities of the gray filters may vary continuously or in steps. The filters are selectively movable into the optical path so that, depending upon the position of the disc 16, the intensity of the illumination from the lamp 11 is reduced to a greater or lesser extent. The disc 16 is driven by a pinion which engages the periphery of the disc 16 and is connected to a motor 17. A position indicator 18 shows the instantaneous position of the disc 16.

A color filter disc 19 is arranged adjacent to the gray filter disc 16 between the latter and the mixing shaft 29. The color filter disc 19 is provided with red, green and blue filter sections which are selectively movable into the optical path. For calibration purposes, the color filter disc 19 may further have a section or segment in the form of a cutout. As is the case for the gray filter disc 16, the color filter disc 19 is driven by a pinion which engages the periphery of the color filter disc 19 and is connected to a motor 20. The color filter disc 19 is mounted on a shaft, and a position indicator 21 carried by the shaft indicates the color of the filter section located in the optical path to a central control unit.

The holder 27 for the originals 23 is designed to hold a strip containing a predetermined number of negatives or, alternatively, a like number of diapositives. In the illustrated embodiment, the holder 27 accommodates six originals as indicated by the reference characters I,II,III,IV,V and VI. The holder 27 includes a magazine 22 having a length conforming to that of a strip containing the predetermined number of negatives or to the total length of a like number of diapositives. The magazine 22 is driven by a motor 24 which advances the magazine 22 and originals 23 step-by-step so that a fresh original 23 becomes aligned with the optical path once the preceding original 23 has been copied. A position indicator 26 is associated with the motor 24 and functions to stop the latter whenever the motor 24 has advanced the magazine 22 by the length of an original 23. A control switch 25 is provided for the magazine 22 and serves to detect the presence of originals 23.

A support or platform 35 is located on the side of the holder 27 remote from the lamp 11. A carriage 36 is mounted on the support 35 for limited movement along the optical path. A mechanism 37 for controlling movement of the carriage 36 is disposed on the side of the carriage 36 remote from the holder 27 while one or more resilient biasing elements such as springs are arranged between the support 35 and the carriage 36 on the side of the latter facing the holder 27.

The carriage 36 supports a reflector 38 which is pivotable between a first position shown by a full line and a second position shown by a broken line. In the first position, the reflector 38 projects into the optical path while, in the second position, the reflector 38 is located out of the optical path. A drive 39 is provided to pivot the reflector 38 into and out of the optical path.

Light which has passed through an original 23 located in the optical path enters an objective 31 which is likewise mounted on the carriage 36. When the reflector 38 is in the broken line position and thus out of the optical path, the objective 31 forms an image of the original 23 in an image plane defined by a photodetector 41. The photodetector 41, which is here in the form of an elongated straight or linear horizontally oriented charge-coupled device, is also mounted on the carriage 36.

On the other hand, when the reflector 38 is in the full line position and hence in the optical path, the reflector 38 causes the objective 31 to form an image of the original 23 on a measuring device 40 which is again mounted on the carriage 36. The measuring device 40 divides the image of the original 23 into a relatively large number of regions of equal size, e.g., approximately 100 regions. These regions may, for instance, be square or rectangular and, in such an event, may be arranged in rows and columns. The regions preferably cover the surface of the original 23 all the way to the edge with no gaps. It will be apparent that each of the regions of the original 23 is constituted by an area having a large number of points and is thus large as compared to a point. The measuring device 40 is designed to measure the densities or transparencies of each of the regions of the original 23 in each of the three primary colors red, green and blue.

In accordance with the teachings of the West German Auslegeschrift No. 25 35 034, which are incorporated herein by reference, the measured densities or transparencies of each region are used to derive parameters for the respective region characteristic of the coloring of such region. The parameters may, for example, be constituted by ratios of the measured transparencies or by differences between the densities. The densities are obtained by taking logarithms.

The parameters derived in this manner are then compared with respective threshold values. The threshold values are selected on the basis of experience so as to detect regions having color dominants, that is, regions which deviate distinctly from an average or neutral gray because of the coloring of their motifs. When the parameters for a region exceed the respective threshold values, there is a high probability that the region contains a color dominant.

Once the characteristic parameters for the various regions have been compared with the respective threshold values, the densities of the different regions in each primary color are summed in order to arrive at an overall density for the original 23 in each primary color. In calculating the overall densities of the original 23 in the three primary colors, the regions containing color dominants are treated differently than the regions which are substantially free of color dominants. For example, per the teachings of the West German Auslegeschrift No. 25 35 034, the densities of the regions containing color dominants may be reduced by means of a voltage divider during summation of the densities of the various regions to arrive at overall densities for the original 23. Alternatively, the densities of the regions containing color dominants may be replaced by a gray density calculated as an average of the three densities for the primary colors. It is further possible to disregard the regions with color dominants altogether. In any event, the regions containing color dominants are assigned less weight than the regions without color dominants in calculating overall densities for the original 23 in the three primary colors. The overall densities obtained in this manner allow the amounts of red, green and blue radiation in the copy light to be related to one another such that a gray region of the original 23 is reproduced in the copy as an uncolored gray.

As explained previously, when the reflector is pivoted out of the optical path to the broken line position, an image of the original 23 is formed in the image plane defined by the straight horizontal charge-coupled device constituting the photodetector 41. The image plane is a vertical plane, and the photodetector 41 is movable up-and-down parallel to such plane. To this end, the photodetector 41 is mounted on a guide 42. A motor 43 continuously moves the photodetector 41 across the surface of the original 23 located in the optical path via a gear mechanism 44. The limits of the vertical path of the photodetector 41 are indicated by a light barrier 45. A pulse generator 46 connected with the motor 43 controls the latter and also supplies pulses to regulate scanning of the original 23 by the photodetector 41.

The objective 31 is mounted on a revolver 32 which carries additional objectives of different types. The revolver 32 is rotatable to various positions via a motor 33 in order to position different objectives in the optical path. A position indicator 34 identifies the particular objective which is located in the optical path. The different objectives make it possible to form images of equal size on the measuring device 40 and the photodetector 41 for originals 23 of different size.

The operation of the arrangement described above is as follows:

With the reflector 38 pivoted to the full line position in which it projects into the optical path, an image of an original 23 located in the optical path is formed on the measuring device 40 so that such image fills the scanning area of the device 40. At this time, the shutter 14 is open. Depending upon the design of the measuring device 40, the image of the original 23 can be formed by successively exposing the measuring device 40 to radiation in the three primary color components red, green and blue of the original 23. This may be accomplished by successively moving the red, green and blue filter sections of the color filter disc 19 into the optical path. On the other hand, the measuring device 40 may be designed so that the image of the original 23 is formed by exposing the measuring device 40 to the three primary color components simultaneously. In such an event, the light arriving at the measuring device 40 is uncolored and is divided into the primary color components in the measuring device 40.

As mentioned earlier, the measuring device 40 divides the image of the original 23, and hence the original 23, into a number of regions each of which represents an area constituted by a large number of points. The measuring device 40 measures the transparencies or densities of each of these regions in each of the primary colors red, green and blue. The measured transparencies or densities are then used to derive one or more parameters for each region characteristic of the coloring of the respective region. The measured transparencies or densities in the different primary colors may be determined one after the other and stored in a memory before undergoing processing to derive the respective parameters or, alternatively, may be determined simultaneously and processed immediately. Regardless, the measured transparencies or densities are processed according to the teachings of the West German Auslegeschrift No. 25 35 034 in such a manner that the characteristic color parameters for a region are calculated separately and thereafter compared with threshold values which depend upon and are specific to the particular type of film constituting the original 23. When the characteristic color parameters for a region exceed the threshold values, such region is considered to contain a color dominant and is treated differently from regions free of color dominants in calculating overall densities for the original 23 in the three primary colors.

An improved method for detecting color dominants is disclosed in the commonly-owned published European Patent Application No. 128 349 which is incorporated herein by reference. This method is particularly well-adapted for a series of coherent originals constituting part of the same filmstrip. Here, the threshold values are not assigned simply on the basis of the type of film constituting the originals, i.e., the threshold values for two discrete originals made of the same type of film are not necessarily the same. Rather, when the transparencies or densities of the originals in the three primary colors are measured, the entire filmstrip is inspected to determine the location of the latter having the lowest gray density. In other words, transparency or density measurements are carried out not only on the originals but also on the lateral margins of the filmstrip and the webs between neighboring originals. The characteristic color parameters for the respective regions are then determined with reference to the location of the filmstrip having the minimum gray density. This has the advantage of allowing threshold values of general validity, that is, threshold values which are valid for all types of film, to be specified.

The European Patent application further teaches that the magnitudes of the threshold values are increased with increasing neutral density. Thus, the threshold values for a given region depend upon the neutral gray density of such region. The threshold values for a particular region may additionally be a function of the direction of the color vector of the region.

Once the characteristic color parameters have been calculated and compared with the threshold values, an overall density is calculated for the original 23 in each of the primary colors red, green and blue. As outlined previously, calculation of the overall densities is carried out assigning less weight to regions considered to contain color dominants than to regions free of color dominants.

Processing of the transparencies or densities obtained from the measuring device 40 may be performed in the manner disclosed in the West German Auslegeschrift no. 25 35 034 or the European Patent Application No. 128 349. The processing may be carried out using a microprocessor 50 and a memory 51 and may be readily performed even with a microprocessor 50 having relatively low output and a memory 51 of only modest capacity.

Upon completion of the measuring operation, the reflector 38 is pivoted from the full line position to the broken line position in which it is out of the optical path. The color filter disc 19 is now rotated to a position in which a first filter section, e.g., the red filter section, lies in the optical path. At the same time, the three overall densities of the original 23 are compared in order to establish the relationships which must exist between the amounts of radiation in the red, green and blue color components of the copy light to produce a neutral gray copy from a gray original. In order to obtain a weighted color impression in the copy, the amount of radiation must be greatest for that color component of the copy light corresponding to the greatest overall density of the original 23. To this end, the most transparent section of the gray filter disc 16 is moved into the optical path when the photodetector 41 scans the original 23 in the color of greatest overall density. During scanning of the original 23 in the color having the next greatest overall density, the gray filter disc 16 is moved to a position in which a less transparent section thereof is located in the optical path. This causes the intensity of the illumination in such color to be reduced relative to the intensity of the illumination in the color of greatest overall density. When the original 23 is scanned in the color having the lowest overall density, the gray filter disc 16 is positioned so that the intensity of the illumination in this color is reduced even more.

The photodetector 41 generates imaging signals which are fed into the memory 6. By varying the intensity of the illumination in the primary colors as a function of the overall densities of the original 23 in the respective colors, the imaging signals for the various colors have different magnitudes. The magnitudes of the imaging signals for the different colors have exactly the relationship which will yield a weighted coloring in the copy produced by the printer 3.

Before printing, the imaging signals generated by the photodetector 41 are electronically processed in the imaging signal processor 4 to enhance the image of the original 23. The processed imaging signals are subsequently forwarded to the printer 3.

The gray filter disc 16 may be in the form of a stepped disc, that is, a disc provided with a plurality of transparent gray sections or filters having boundaries at which the density changes abruptly. However, since the relatively minor inhomogeneity of the light travelling along the optical path is largely eliminated by the mixing shaft 29 located downstream of the gray filter disc 16, the latter may alternatively be formed with a single gray section of continuously varying density.

A conventional diaphragm having an adjustable aperture may be used to regulate the intensity of the illumination as a function of the overall densities of the original 23. Such a diaphragm, which can replace the gray filter disc 16, may be associated with the condenser 28, the condenser 30 or the objective 31.

Another alternative to the gray filter disc 16 exists when the photodetector 41 comprises a charge-coupled device. Here, the magnitudes of the imaging signals delivered to the memory 6 by the photodetector 41 may be regulated by varying the integration time for the different primary colors in dependence upon the overall densities of the original 23 in the respective colors. The integration time for a particular color is the period during which the photocurrents from the individual photodiodes are summed.

Since the number of regions measured by the measuring device 40 is much smaller than the number of points scanned by the photodetector 41, the effort required to process the signals from the measuring device 40 for purposes of automatic color correction is orders of magnitude less than that for automatic color correction based on the individual points scanned by the photodetector 41.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A method of copying a colored original, comprising the steps of measuring the densities of each of a multiplicity of regions of said original in each of the three primary colors, each of said regions being constituted by a large number of points; calculating an overall density for said original in each of the three primary colors taking color dominants into account; scanning said original point-by-point in each of the three primary colors, the scanning step including generating imaging signals for each of the three primary colors in such a manner that the magnitudes of the signals for one primary color are increased relative to the magnitudes of the signals for another primary color having a lower overall density than said one primary color; and forming an image of said original on copy material point-by-point based on said signals.

2. The method of claim 1, wherein the scanning and forming steps are performed line-by-line and point-by-point.

3. The method of claim 1, further comprising the step of processing said signals to enhance said image, the processing step being performed between the scanning and forming steps.

4. The method of claim 3, wherein the processing step is performed electronically.

5. The method of claim 1, wherein the forming step is performed using a cathode ray beam.

6. The method of claim 1, further comprising the steps of deriving at least one parameter for each region characteristic of the coloring of the respective region from the measured densities; and comparing each of said parameters with a threshold value, the calculating step including assigning less weight to regions for which the parameter exceeds the threshold value than to regions for which the parameter is below the threshold value.

7. The method of claim 6, said original constituting part of a strip containing a plurality of originals; and further comprising the step of determining the location of said strip having the lowest gray density, the deriving step including relating said parameters to the gray density of said location.

8. The method of claim 6, further comprising the step of determining a gray density for each of said regions; and calculating a threshold value for each region based on the respective gray density.

9. The method of claim 8, further comprising the step of establishing the direction of the color vector for each of said regions, the threshold value for each region being calculated based on the respective direction.

10. The method of claim 6, said original being constituted by a predetermined type of photosensitive material; and wherein said threshold values are specific to said predetermined type.

11. The method of claim 1, wherein the scanning step is performed using a source of illumination, and a photoreceiver arranged to be illuminated by said source, the scanning step including regulating the magnitudes of said signals by controlling the intensity of the illumination arriving at said photoreceiver.

12. The method of claim 1, wherein the scanning step is performed using a source of illumination, and a photoreceiver arranged to be illuminated by said source and comprising a charge-coupled device, the scanning step including regulating the magnitudes of said signals by varying the integration time of said photoreceiver.

13. The method of claim 1, wherein the scanning step comprises regulating the magnitudes of said signals so that regions which are substantially free of color dominants are substantially neutral gray in said image.

14. An arrangement for copying a colored original, comprising means for measuring the densities of each of a multiplicity of regions of the original in each of the three primary colors, said measuring means being operative to measure regions of the original constituted by a large number of points; means for calculating an overall density for the original in each of the three primary colors based on the measured densities and taking color dominants into account; means for scanning the original point-by-point in each of the three primary colors, said scanning means being operative to generate imaging signals for each of the primary colors; and means for regulating the magnitudes of the imaging signals as a function of the relationships between the overall densities of the original in the three primary colors.

15. The arrangement of claim 14, wherein said calculating means is operative to derive at least one parameter for each region characteristic of the coloring of the respective region from the measured densities and to compare each parameter with a threshold value, said calculating means further being operative to calculate the overall densities for the original by assigning less weight to regions for which the parameter exceeds the threshold value than to regions for which the parameter is below the threshold value.

16. The arrangement of claim 14, wherein said scanning means is designed to scan the original line-by-line and point-by-point.

17. The arrangement of claim 14, further comprising a source of illumination; means for directing the illumination from said source towards said measuring means and said scanning means along a predetermined path; and a reflector movable into and out of said path so as to permit selective illumination of said measuring means and said scanning means.

18. The arrangement of claim 17, wherein said reflector is mounted for pivotal movement into and out of said path.

19. The arrangement of claim 17, wherein said measuring means and said scanning means are arranged such that said measuring means is illuminated when said reflector is in said path and said scanning means is illuminated when said reflector is out of said path.

20. The arrangement of claim 14, further comprising a source of illumination; and means for directing illumination from said source towards said measuring means and said scanning means along a predetermined path.

21. The arrangement of claim 20, wherein said regulating means comprises a device for adjusting the intensity of the illumination travelling along said path.

22. The arrangement of claim 21, wherein said device comprises an element having transparent sections with different gray densities, said sections being selectively movable into said path.

23. The arrangement of claim 21, wherein said device comprises an element having an adjustable aperture.

24. The arrangement of claim 21, wherein said device is operative in automatic response to said calculating means.

25. The arrangement of claim 20, further comprising a filter having red, blue and green sections which are selectively movable into said path.

26. The arrangement of claim 14, wherein said scanning means comprises a linear charge-coupled device.

27. The arrangement of claim 14, further comprising means for forming an image of the original on copy material in response to the imaging signals.

28. The arrangement of claim 27, further comprising means for enhancing the image of the original, said enhancing means being disposed between said scanning means and said forming means.

* * * * *